United States Patent Office 3,558,604
Patented Jan. 26, 1971

3,558,604
PROCESS FOR PRODUCING BENZODIAZEPINE DERIVATIVES
Hisao Yamamoto, Nishinomiya-shi, Shigeho Inaba, Takarazuka-shi, Tadashi Okamoto, Ashiya-shi, Toshiyuki Hirohashi, Kobe, Kikuo Ishizumi, Minoo-shi, Michihiro Yamamoto, Takarazuka-shi, Isamu Maruyama, Minoo-shi, Kazuo Mori, Kobe, and Tsuyoshi Kobayashi, Minoo-shi, Japan, assignors to Sumitomo Chemical Company, Ltd., Osaka, Japan, a corporation of Japan
No Drawing. Filed Feb. 25, 1969, Ser. No. 802,259
Int. Cl. C07d 53/06
U.S. Cl. 260—239.3
4 Claims

ABSTRACT OF THE DISCLOSURE

Benzodiazepine derivatives useful as tranquillizers, muscle-relaxants, spasmolytics or hypnotics and represented by the formula:

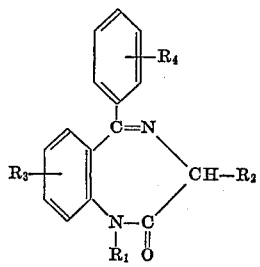

wherein $R_1$ and $R_2$ signify individually a hydrogen atom or a lower alkyl group; $R_3$ signifies a hydrogen atom, a halogen atom, a nitro group, a lower alkyl group or a trifluoromethyl group; and $R_4$ signifies a nitro group or a trifluoromethyl group, are prepared by oxidizing a 2-aminomethylindole derivative represented by the formula:

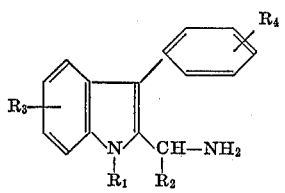

wherein $R_1$, $R_2$, $R_3$ and $R_4$ have the same meanings as defined above.

---

This invention relates to a novel process for preparing benzodiazepine derivatives and salts thereof. More particularly, the invention pertains to a novel process for producing benzodiazepine derivatives, and salts thereof, represented by the formula:

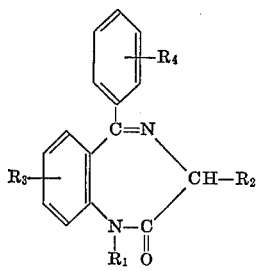

wherein $R_1$ and $R_2$ signify individually a hydrogen atom or a lower alkyl group having 1 to 3 carbon atoms; $R_3$ signifies a hydrogen atom, a halogen atom, a nitro group, a lower alkyl group having 1 to 3 carbon atoms or a trifluoromethyl group; and $R_4$ signifies a nitro group or a trifluoromethyl group.

It is known that benzodiazepine derivatives represented by the above-mentioned Formula I and salts thereof have prominent effects as tranquillizers, muscle-relaxants, spasmolytics and hypnotics.

Heretofore, benzodiazepine derivatives of the Formula I' have been produced by reacting a benzophenone derivative of the Formula II with a haloacyl halide of the Formula III, treating the resulting (haloacyl-amido-)-benzophenone derivative with ammonia and heating the product should it be any uncyclized compound. (British Pat. 1,000,507).

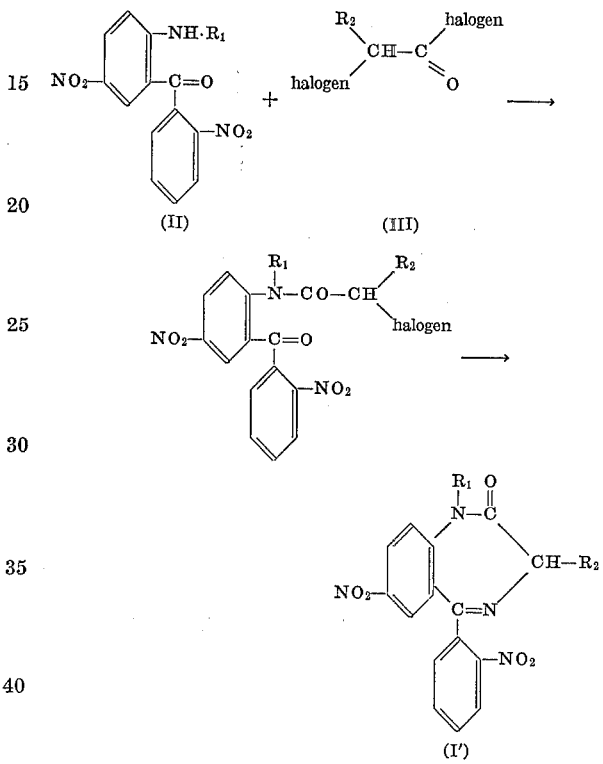

wherein $R_1$ and $R_2$ have the same meanings as defined above.

The present inventors have found that benzodiazepine derivative of the Formula I can be obtained in high yield and purity by treating a 2-aminomethylindole derivative, or a salt thereof, represented by the formula:

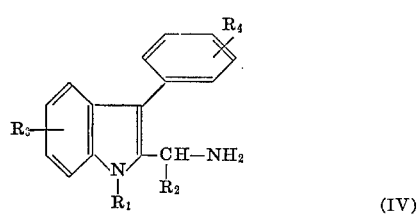

(IV)

wherein $R_1$, $R_2$, $R_3$ and $R_4$ have the same meanings as defined above, with an oxidizing agent. Such a process for converting a 5-membered ring compound into a 7-membered ring compound by ring expansion reaction has not heretofore been described or suggested in any literature.

Accordingly, it is one object of the present invention to provide a novel process for producing benzodiazepine derivative of the Formula I advantageously.

Other objects of the present invention will be apparent from the following description.

In order to accomplish these objects, the present invention provides a process for producing benzodiazepine derivatives of the Formula I, which comprises contacting a 2-aminomethylindole derivative of the Formula IV or a salt thereof with an oxidizing agent to obtain a benzodiazepine derivative of the Formula I.

In the process of the present invention, reactions for production of the benzodiazepine derivatives of the Formula I smoothly proceed and the objective compounds are produced in high yields.

In preparing the benzodiazepine derivatives according to this invention, 2-aminomethylindole derivatives represented by the Formula IV, or salts thereof, are reacted with an appropriate oxidizing agent. The oxidizing agent for this process includes, for example, ozone, hydrogen peroxide, peracids (e.g., performic, peracetic and perbenzoic acids), and chromic acid, but is not limited to the named compounds. Generally, the reaction progresses readily at room temperature, but the temperature may be higher or lower as necessary to effect the desired control of the reaction. The oxidizing agent is preferably chromic acid or ozone. The reaction is preferably effected in the presence of a solvent. The choice of solvent depends on the oxidizing agent employed, and is selected from the group consisting of water, acetone, carbon tetrachloride, acetic acid, sulfuric acid and the like. The oxidizing agent is used in the stoichiometric amount or more. The reaction temperature varies depending on the oxidizing agent employed.

Where the oxidation is carried out by use of chromic acid in the presence of acetic acid, it is preferable that the chromic acid may be used in 2–3 times of the equimolar amount and that the reaction may be carried out at room temperature. A 2-aminomethylindole derivative is dissolved or suspended in the solvent and the oxidizing agent is added to the solution or suspension with stirring. Generally, the reaction terminates with about 24 hours.

Where the oxidation is carried out by use of ozone, the reaction is preferably carried out at room temperature. A 2-aminomethylindole derivative is dissolved or suspended in the solvent such as formic acid, acetic cid, carbontetrachloride or the like and ozonized oxygen is bubbled into the solution or suspension with stirring.

Benzodiazepine derivatives of the Formula I may also be isolated as acid salts with, for example, mineral acids such as hydrochloric acid, sulfuric acid, nitric acid and phosphoric acid, or with organic acids such as maleic acid, fumaric acid, succinic acid, formic acid and acetic acid.

According to the present process, for example, the following benzodiazepine derivatives and salts thereof are produced.

5-(o-nitrophenyl)-1,3-dihydro-2H-1,4-benzodiazepin-2-one,
5-(o-nitrophenyl)-7-chloro-1,3-dihydro-2H-1,4-benzodiabepin-2-one,
5-(o-nitrophenyl)-7-nitro-1,3-dihydro-2H-1,4-benzodiazepin-2-one,
5-(o-nitrophenyl)-8(or 6)-nitro-1,3-dihydro-2H-1,4-benzodiazepin-2-one,
5-(o-nitrophenyl)-7-methyl-1,3-dihydro-2H-1,4-benzodiazepin-2-one,
5-(o-nitrophenyl)-7-trifluoromethyl-1,3-dihydro-2H-1,4-benzodiazepin-2-one,
5-(p-nitrophenyl)-7-chloro-1,3-dihydro-2H-1,4-benzodiazepin-2-one,
5-(p-nitrophenyl)-7-nitro-1,3-dihydro-2H-,1,4-benzodiazepin-2-one,
5-(p-nitrophenyl)-7-trifluoromethyl-1,3-dihydro-2H-1,4-benzodiazepine-2-one,
5-(o-trifluoromethyl-phenyl)-1,3-dihydro-2H-1,4-benzodiazepin-2-one,
5-(m-trifluoromethyl-phenyl)-1,3-dihydro-2H-1,4-benzodiazepin-2-one,
5-(p-trifluoromethyl-phenyl)-1,3-dihydro-2H-1,4-benzodiazepin-2-one,
5-(o-trifluoromethyl-phenyl)-7-chloro-1,3-dihydro-2H-1,4-benzodiazepin-2-one,
5-(o-trifluoromethyl-phenyl)-7-nitro-1,3-dihydro-2H-1,4-benzodiazepin-2-one,
5-(o-trifluoromethyl-phenyl)-7-trifluoromethyl-1,3-dihydro-2H-1,4-benzodiazepin-2-one,
1-methyl-5-(o-nitrophenyl)-1,3-dihydro-2H-1,4-benzodiazepin-2-one,
1-methyl-5-(o-nitrophenyl)-7-chloro-1,3-dihydro-2H-1,4-benzodiazepin-2-one,
1-methyl-5-(o-nitrophenyl)-7-nitro-1,3-dihydro-2H-1,4-benzodiazepin-2-one,
1-methyl-5-(o-nitrophenyl)-7-trifluoromethyl-1,3-dihydro-2H-1,4-benzodiazepin-2-one,
1-methyl-5-(p-nitrophenyl)-7-nitro-1,3-dihydro-2H-1,4-benzodiazepin-2-one,
1-methyl-5-(o-trifluoromethyl-phenyl)-1,3-dihydro-2H-1,4-benzodiazepin-2-one,
1-methyl-5-(o-trifluoromethyl-phenyl)-7-chloro-1,3-dihydro-2H-1,4-benzodiazepin-2-one,
1-methyl-5-(o-trifluoromethyl-phenyl)-7-nitro-1,3-dihydro-2H-1,4-benzodiazepin-2-one,
1-methyl-5-(o-trifluoromethyl-phenyl)-7-trifluoromethyl-1,3-dihydro-2H-1,4-benzodiazepin-2-one and
1-methyl-5-(p-trifluoromethyl-phenyl)-7-chloro-1,3-dihydro-2H-1,4-benzodiazepin-2-one, The process of the present invention is illustrated below with reference to examples, but the examples are merely illustrative and it is needless to say that the invention is not limited only to them.

EXAMPLE 1

A solution of 3 g. of chromic anhydride in 3 ml. of water is added dropwise to a mixture of 1-methyl-2-aminomethyl - 3 - (o - nitrophenyl)-5-nitro-indole hydrochloride and 40 ml. of glacial acetic acid with stirring under cooling. The mixture is stirred at room temperature overnight. The precipitates are collected by filtration, washed with acetic acid and treated with aqueous ammonia to neutralize under cooling to give 1-methyl-5-(o-nitrophenyl)-7-nitro-1,3-dihydro - 2H - 1,4-benzodiazepin-2-one, which is recrystallized from methylene chloride-methanol, M.P. 209°–212° C.

EXAMPLE 2

Ozonized oxygen is bubbled into a mixture of 3.6 g. of 1-methyl-2-aminomethyl-3-(o-nitrophenyl)-5-nitro-indole hydrochloride and 40 ml. of glacial acetic acid at 15°–20° C. for 2 hours with stirring.

The reaction mixture is neutralised with aqueous ammonia and extracted with methylene chloride. The organic layers are combined and dried over sodium sulfate, and the solvent is removed under reduced pressure. The residue is recrystallized from methylene chloride-methanol to give 1-methyl-5-(o-nitrophenyl)-7-nitro-1,3-dihydro-2H-1,4-benzodiazepin-2-one, M.P. 208°–211° C.

EXAMPLE 3

A solution of 3 g. of chromic anhydride in 3 ml. of water is added to a mixture of 3 g. of 2-aminomethyl-3-(o-nitrophenyl)-indole hydrochloride in 40 ml. of acetic acid with stirring under cooling. The mixture is stirred overnight at room temperature. The reaction mixture is neutralized by addition of an aqueous ammonia under cooling. The deposited precipitates are collected by filtration, washed with water, dried and then dissolved in 20 ml. of pyridine. After the solution is refluxed for 24 hours, the solvent is distilled off under reduced pressure. The residue is dissolved in a hot mixture of 1 ml. of ethanol, 5 ml. of concentrated hydrochloric acid and 5 ml. of water and treated with active carbon under reflux for a few minutes and the mixture is filtered. The filtrate is cooled and neutralized with aqueous ammonia under cooling and extracted with a mixture of methylene chloride and ether. The extract is concentrated under reduced pressure, and the residue is recrystallized from benzene to give 5-(o-nitrophenyl)-1,3-dihydro-2H-1,4-benzodiazepin-2-one, M.P. 207°–209° C.

EXAMPLE 4

A solution of 3 g. of chromic anhydride in 3 ml. of water is added dropwise to a mixture of 3.5 g. of 2-aminomethyl-3-(o-nitrophenyl) - 5-nitro-indole hydrochloride with stirring under cooling. The mixture is stirred overnight at room temperature. The reaction mixture is neutralized with aqueous ammonia below 20° C. The precipitates are collected by filtration, washed with water, dried and heated with dimethyl sulfoxide on steam bath. The dimethyl sulfoxide is removed under reduced pressure and the residue is crystallized from tetrahydrofuran to give 5-(o-nitrophenyl)-7-nitro-1,3-dihydro-2H-1,4-benzodiazepin-2-one, M.P. 227°–229° C.

EXAMPLE 5

According to the procedure similar to that of Example 4, but replacing 2-aminomethyl-3-(o-nitrophenyl)-5-nitro-indole hydrochloride by 2-aminomethyl-3-(o-trifluoromethyl-phenyl)-5-nitro-indole hydrochloride, there is obtained 5-(o-trifluoromethyl-phenyl)-7-nitro-1,3-dihydro-2H-1,4-benzodiazepin-2-one, which is recrystallized from acetone-methanol, M.P. 234°–235° C.

EXAMPLE 6

According to the procedure similar to that of Example 4, but replacing 2-aminomethyl-3-(o-nitrophenyl)-5-nitro-indole hydrochloride by 2-aminomethyl-3-(m-trifluoromethyl-phenyl)-indole hydrochloride, there is obtained 5-(m-trifluoromethyl-phenyl) - 1,3-dihydro-2H-1,4-benzodiazepin-2-one, which is recrystallized from acetone-benzene, M.P. 203°–205° C.

EXAMPLE 7

According to the procedure similar to that of Example 4, but replacing 2-aminomethyl-3-(o-nitro-phenyl)-5-nitro-indole hydrochloride by 2-aminomethyl-3-(o-trifluoromethyl-phenyl)-5-chloro-indole hydrochloride, there is obtained 5-(o-trifluoromethyl-phenyl)-7-chloro-1,3-dihydro-2H-1,4-benzodiazepin-2-one, which is recrystallized from heptane-benzene, M.P. 190°–192° C.

EXAMPLE 8

According to the procedure similar to that of Example 4, but replacing 2-aminomethyl-3-(o-nitrophenyl)-5-nitro-indole hydrochloride by 2-aminomethyl-3-(o-trifluoromethyl-phenyl)-5 - trifluoromethyl-indole hydrochloride, there is obtained 5-(o-trifluoromethyl-phenyl)-7-trifluoro-7-nitro-1,3-dihydro-2H-1,4-benzodiazepin-2-one, which is recrystallized from acetone, M.P. 198°–199° C.

EXAMPLE 9

According to the procedure similar to that of Example 4, but replacing 2-aminomethyl-3-(o-nitrophenyl)-5-nitro-indole hydrochloride by 1-methyl-2-aminomethyl-3-(o-trifluoromethyl-phenyl)-5-nitro-indole hydrochloride, there is obtained 1-methyl-5-(o-trifluoromethyl-phenyl)-7-nitro-1,3-dihydro-2H-1,4-benzodiazepin-2-one, which is recrystallized from acetone, M.P. 198°–199° C.

EXAMPLE 10

According to the procedure similar to that of Example 4, but replacing 2-aminomethyl-3-(o-nitrophenyl)-5-nitro-indole hydrochloride by 1-methyl-2-aminomethyl-3-(o-trifluoromethyl-phenyl)-indole hydrochloride, there is obtained 1-methyl-5-(o-trifluoromethyl-phenyl)-1,3-dihydro-2H-1,4-benzodiazepin-2-one, which is recrystallized from aqueous ethanol, M.P. 135°–137° C.

What we claim is:

1. A process for preparing benzodiazepine derivatives, and acid addition salts thereof, represented by the formula:

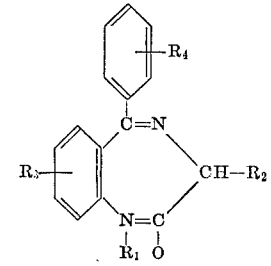

wherein $R_1$ and $R_2$ signify individually a hydrogen atom or a lower alkyl group having 1–3 carbon atoms; $R_3$ signifies a hydrogen atom, a halogen atom, a nitro group, a lower alkyl group having 1–3 carbon atoms or a trifluoromethyl group; and $R_4$ signifies a nitro group or a trifluoromethyl group, which comprises contacting a 2-aminomethylindole derivative, or an acid addition salt thereof, represented by the formula:

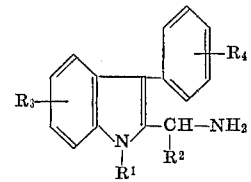

wherein $R_1$, $R_2$, $R_3$ and $R_4$ are as defined above, with at least the stoichiometric amount of an oxidizing agent selected from the group consisting of ozone, hydrogen peroxide, performic acid, peracetic acid, perbenzoic acid and chromic acid in the presence of a solvent.

2. A process according to claim 1, wherein the oxidizing agent is chromic acid or ozone and the reaction is carried out at a room temperature.

3. A process according to claim 1, wherein the solvent is water, acetone, carbon tetrachloride, formic acid, acetic acid or sulfuric acid.

4. A process according to claim 1, wherein the acid in the acid addition salt of said benzodiazepine and 2-aminomethylindole derivatives is hydrochloric acid, sulfuric acid, nitric acid, phosphoric acid, maleic acid, fumaric acid, succinic acid, formic acid or acetic acid.

References Cited

UNITED STATES PATENTS 3,371,085  2/1968  Reeder et al. _____ 260—239.3

HENRY R. JILES, Primary Examiner

R. T. BOND, Assistant Examiner

U.S. Cl. X.R.

260—326.15

UNITED STATES PATENT OFFICE
CERTIFICATE OF CORRECTION

Patent No. 3,558,604　　　　　　　　Dated January 26, 1971

Inventor(s) Hisao Yamamoto et al

It is certified that error appears in the above-identified patent and that said Letters Patent are hereby corrected as shown below:

In the heading to the printed specification, after line 10, should read -- Claim priority application Japan March 5, 1968, 14454/68 --.

Signed and sealed this 19th day of December 1972.

(SEAL)
Attest:

EDWARD M. FLETCHER, JR.　　　　　　ROBERT GOTTSCHALK
Attesting Officer　　　　　　　　　Commissioner of Pate